(12) United States Patent
Kogure et al.

(10) Patent No.: US 9,218,104 B2
(45) Date of Patent: Dec. 22, 2015

(54) IMAGE PROCESSING DEVICE, IMAGE PROCESSING METHOD, AND COMPUTER PROGRAM PRODUCT

(71) Applicant: KABUSHIKI KAISHA TOSHIBA, Minato-ku, Tokyo (JP)

(72) Inventors: Nakaba Kogure, Zama (JP); Shinichiro Koto, Tokyo (JP); Tomoyuki Takeguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 14/199,085

(22) Filed: Mar. 6, 2014

(65) Prior Publication Data
US 2014/0340371 A1   Nov. 20, 2014

(30) Foreign Application Priority Data
May 14, 2013   (JP) ................................. 2013-102297

(51) Int. Cl.
*G06F 3/0481* (2013.01)
*G06F 3/0354* (2013.01)

(52) U.S. Cl.
CPC ........ *G06F 3/04815* (2013.01); *G06F 3/03545* (2013.01)

(58) Field of Classification Search
CPC .......................... G06F 3/03545; G06F 3/04883
IPC ..................................... G06F 3/04815, 3/03545
See application file for complete search history.

(56) References Cited

U.S. PATENT DOCUMENTS
2011/0191707 A1   8/2011   Lee et al.

FOREIGN PATENT DOCUMENTS
JP   2008-47047   2/2008
JP   2011-159273   8/2011

OTHER PUBLICATIONS

Takeglichi, T. et al., "Image Processing Device, Image Processing Method, And Stereoscopic Image Display Device," U.S. Appl. No. 14/191,755, filed Feb. 27, 2014.

*Primary Examiner* — Ricardo L Osorio
(74) *Attorney, Agent, or Firm* — Finnegan, Henderson, Farabow, Garrett & Dunner, L.L.P.

(57) ABSTRACT

According to an embodiment, a display device includes a display, a deciding unit, a three-dimensional input unit, and a controller. The display configured to display partially a two-dimensional image in a two-dimensional area and a stereoscopic image in a three-dimensional area. The deciding unit is configured to based on a position of the three-dimensional area in the display, decide on a range of a space in front of the display, within which operation of the stereoscopic image with an input device is allowed. The three-dimensional input unit configured to obtain three-dimensional coordinate information inputted by the input device with respect to the display. The display controller is configured to, when the three-dimensional coordinate information is within the decided range, operate the stereoscopic image in accordance with the three-dimensional coordinate information.

20 Claims, 6 Drawing Sheets

IMAGE PROCESSING DEVICE, IMAGE PROCESSING METHOD, AND COMPUTER PROGRAM PRODUCT

CROSS-REFERENCE TO RELATED APPLICATION(S)

This application is based upon and claims the benefit of priority from Japanese Patent Application No. 2013-102297, filed on May 14, 2013; the entire contents of which are incorporated herein by reference.

FIELD

Embodiments described herein relate generally to an image processing device, an image processing method, and a computer program product.

BACKGROUND

Three-dimensional monitors capable of displaying stereoscopic images are known. Such three-dimensional monitors either require special glasses for enabling a viewer to view stereoscopic images or enable viewing of stereoscopic images with the unaided eye without having to use special glasses. Besides, an information processing device is known that includes an input device for enabling operations of stereoscopic images displayed in a three-dimensional monitor. As far as the input methods using an input device are concerned, a two-dimensional operation input method is known in which a mouse or a touch-sensitive panel is used and is three-dimensional operation input method is known in which a pen-type input device is used.

However, in the conventional technology, when a display area for displaying two-dimensional images and a display area for displaying stereoscopic images are present in the same screen, it is difficult to intuitively operate the stereoscopic images displayed on the screen.

DETAILED DESCRIPTION

According to an embodiment, a display device includes a display, a deciding unit, a three-dimensional input unit, and a controller. The display configured to display partially a two-dimensional image in a two-dimensional area and stereoscopic image in a three-dimensional area. The deciding unit is configured to, based on a position of the three-dimensional area in the display, decide on a range of a space in front of the display, within which operation of the stereoscopic image with an input device is allowed. The three-dimensional input unit configured to obtain three-dimensional coordinate information inputted by the input device with respect to the display. The display controller is configured to, when the three-dimensional coordinate information is within the decided range, operate the stereoscopic image in accordance with the three-dimensional coordinate information.

Figure 1:
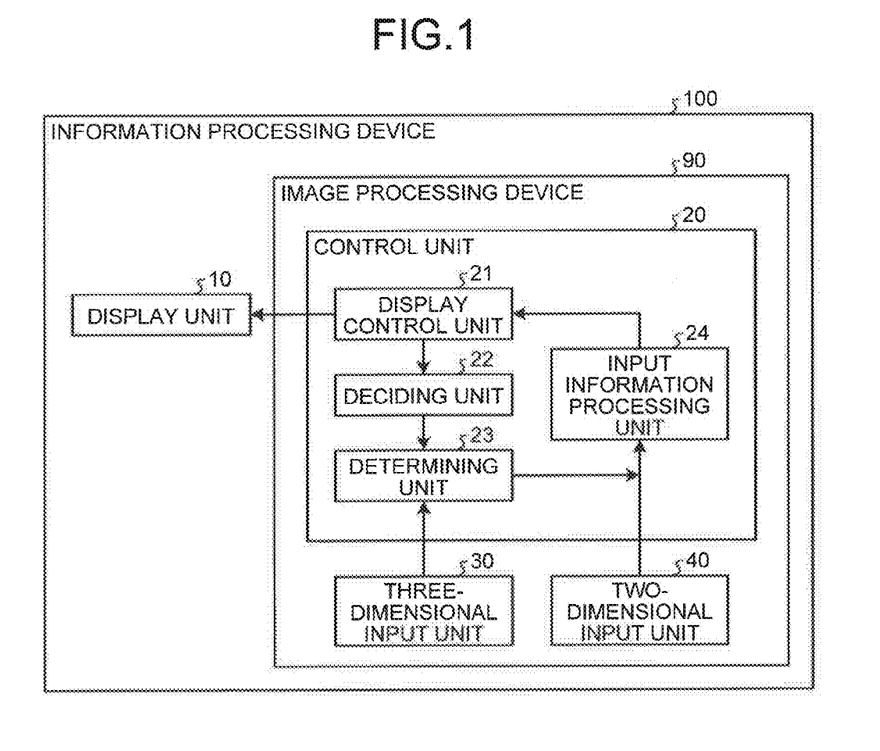
FIG. 1 is a block diagram of an information processing device.

An embodiment is described below in detail with reference to the accompanying drawings. FIG. 1 is a block diagram of an information processing device 100 (A display device) according to the embodiment. The information processing device 100 according to the embodiment includes a display unit 10 and an image processing device 90.

The display unit 10 according to the embodiment has an area for displaying two-dimensional images (i.e., has a two-dimensional area) as well as has an area for displaying stereoscopic images (three-dimensional images) (i.e., has a three-dimensional area).

Moreover, the display unit 10 includes a display panel (such as a liquid crystal panel) (not illustrated) that is used to display images, and includes a light ray control element (not illustrated) that controls the direction of emission of the light rays emitted from the pixels of the display panel. The display panel and the light ray control element are disposed opposite to each other.

In the three-dimensional area, the display unit 10 displays a plurality of images viewed from different viewpoints (i.e., displays a plurality of parallax images).

Herein, the display unit 10 can be a three-dimensional display in which an arbitrary display method such as a lenticular method, a parallax barrier method, or a voltage control method is implemented.

In the case of implementing the lenticular method, the light ray control element is a lenticular lens. In the case of implementing the parallax barrier method, the light ray control element is a parallax barrier. In the case of implementing the voltage control method, the light ray control element is configured to be variable according to the application of voltage (for example, a liquid crystal gradient index (GRIN) lens or a parallax barrier that is openable and closable according to the application of voltage).

In the embodiment, the explanation is given about an example in which an unaided-eye-type 3D display is used. However, alternatively, it is also possible to use a glasses-type 3D display that is accompanied by special glasses. In that case, in the three-dimensional area, the display unit 10 displays stereoscopic images by alternately displays images for left eye and images for right eye.

The image processing device 90 includes a control unit 20 (A control device), a three-dimensional input unit 30, and a two-dimensional input unit 40. The three-dimensional input unit 30 obtains three-dimensional coordinate information corresponding to a three-dimensional operation input. Herein, performing a three-dimensional operation input points to moving an input device in three-dimensional space so as to perform an operation input with respect to a stereoscopic image being displayed in the three-dimensional area of the display unit 10. That is, the three-dimensional input unit 30 obtains three-dimensional coordinate information with respect to the display unit 10 as indicated by the input device. Herein, for example, the three-dimensional input unit 30 can be implemented using an input device and using a detecting device that detects the movements of the input device. The input device can be configured in an arbitrary manner. For example, the input device can be a pen-type input device or a mouse-type input device. The detecting device can be for example, a camera or a sensor. The sensor can be any sensor capable of measuring the three-dimensional coordinate information. For example, the sensor can be an infrared sensor, a light emitting diode (LED) sensor, a magnetic sensor, a gyro sensor, an acceleration sensor, or an ultrasonic sensor. Using the three-dimensional input unit 30 implemented in the manner described above, the user of the information processing device 100 performs a three-dimensional operation input as an instruction to move, rotate, enlarge, or compress a three-dimensional object being displayed in the three-dimensional area.

The two-dimensional input unit 40 obtains two-dimensional coordinate information corresponding to a two-dimensional operation input. Herein, performing a two-dimensional operation input either points to moving an input device in a two-dimensional plane soar to perform an operation input with respect to a two-dimensional image being displayed in the two-dimensional area of the display unit 10, or points to inputting two-dimensional information. That is, the two-dimensional input unit 40 obtains two-dimensional coordinate information indicated by an input device. The two-dimensional input unit 40 can be, for example, a mouse or a touch-sensitive panel.

Figure 2:
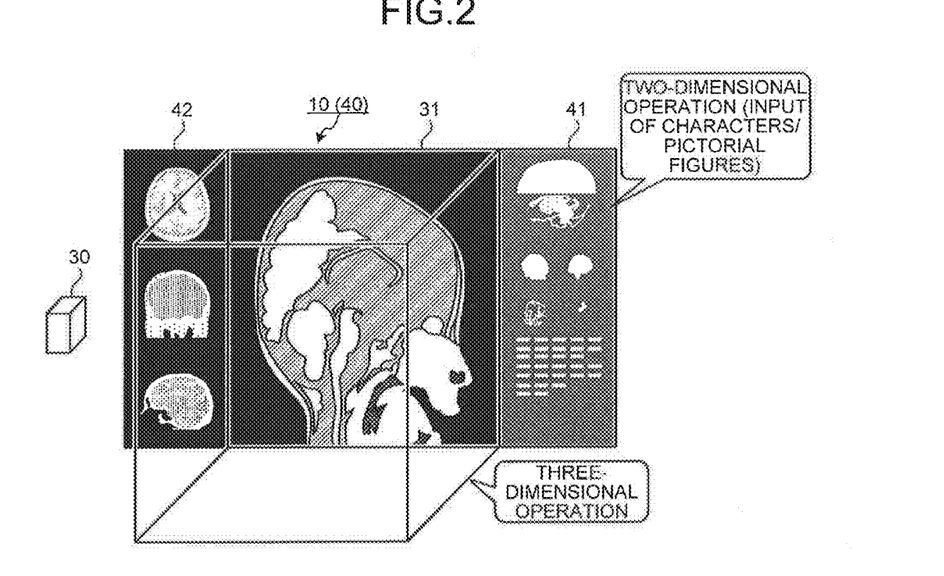
FIG. 2 is a diagram illustrating an example of a two-dimensional input unit and a three-dimensional input unit.
Figure 3:
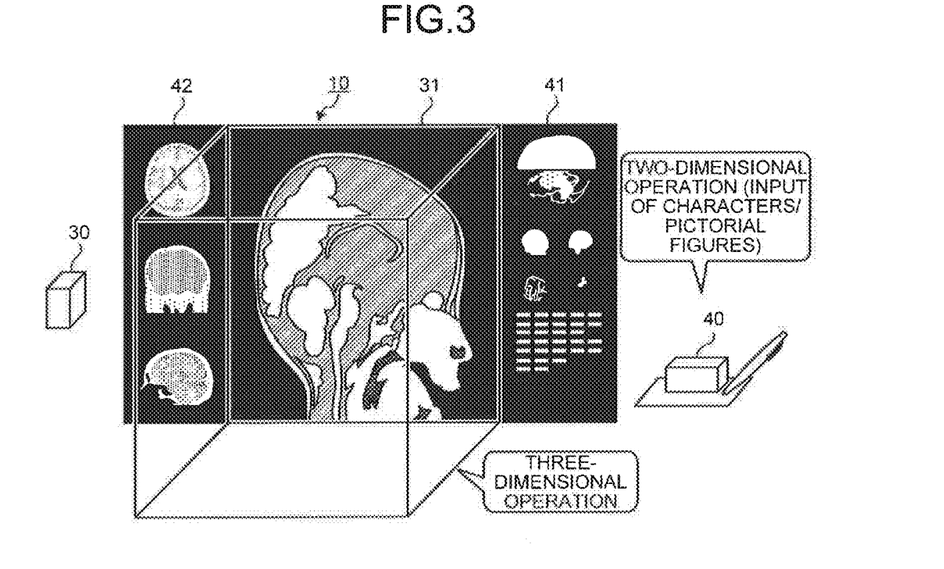
FIG. 3 is a diagram illustrating an example of a two-dimensional input unit and a three-dimensional input unit.

FIGS. 2 and 3 are diagrams illustrating examples of the two-dimensional input unit 40 and the three-dimensional input unit 30 of the image processing device 90 according to the embodiment. Firstly, the explanation is given about the screen of the display unit 10. In the screen, a three-dimensional area 31 points to the area in which a stereoscopic image is being displayed; while two-dimensional areas 41 and 42 point to areas in which two-dimensional images are displayed.

In the example illustrated in FIG. 2, the screen of the display unit 10 is a touch-sensitive panel, and the display unit 10 also functions as the two-dimensional input unit 40. When the touch sensitive panel is operated, it becomes possible to input two-dimensional information such as characters or pictorial figures. The three-dimensional input unit 30 receives a three-dimensional operation input within the space from a pen-type input device using a sensor or a camera. The range of the space within which a three-dimensional operation input is received is determined depending on the three-dimensional area 31 displaying a determining the range of the space within which a three-dimensional operation input is received are given later.

In the example illustrated in FIG. 3, the two-dimensional input unit 40 is a tablet-type planar input device at hand in which a sensor is used. The sensor can be configured to be capable of obtaining two-dimensional coordinates; or can be configured to be capable of obtaining coordinates of a higher degree than two-dimensional coordinates, such as three-dimensional coordinates, and only two-dimensional coordinates can be used. In the example illustrated in FIG. 3, when a movement of a pen-type input device is detected within the range of the space within which three-dimensional operation inputs are received, the three-dimensional input unit 30 receives a three-dimensional operation input. Meanwhile, the pen-type input device used to perform three-dimensional operation inputs is also used to perform two-dimensional operation inputs from the tablet-type planar input device at hand.

Other examples of the method of inputting the two-dimensional information are, for example, using a keyboard and performing audio input using a microphone.

Returning to the explanation with reference to FIG. 1, the control unit 20 includes a display control unit (a controller) 21, a deciding unit 22, a determining unit 23, and an input information processing unit 24. The display control unit 21 displays the two-dimensional area and the three-dimensional area of the display unit 10 while partially switching between those areas. In the three-dimensional area, the display control unit 21 displays a stereoscopic image by displaying a plurality of images viewed from different viewpoints (i.e., a plurality of parallax images) through a light ray control element.

Given below is the explanation of an example of a three-dimensional object that is displayed as a stereoscopic image. For example, in a medical diagnostic imaging device such as an X-ray computed tomography (CT) device, a magnetic resonance imaging (MRI) device, or an ultrasonic diagnostic device; it is possible to obtain volume data that represents a set of cross-section images of a human body. For example, regarding a position in the volume data, the Z-coordinate indicates the cross-sectional image to be used and (X, Y) coordinates indicate the position in that cross-sectional image. With that, the position in the volume data can be expressed as a three-dimensional coordinate. In that volume data, if an arbitrary body part is subjected to volume rendering from a plurality of viewpoints, it becomes possible to obtain a plurality at parallax images. The display control unit 21 makes use of such a plurality of parallax images and displays the arbitrary body part within the volume data as a stereoscopic image.

Meanwhile, a three-dimensional object is not limited to volume data. Alternatively, for example, a three-dimensional object can be three-dimensional computer graphics expressed using a polygon.

Based on the position of the three-dimensional area in the display unit 10, the deciding unit 22 decides on a range of the space within which operations of an input device are receivable for the purpose of operating stereoscopic images. The deciding unit 22 receives coordinate information, which indicates the position of the three-dimensional area in the display unit 10, from the display control unit 21 and accordingly identifies the position of the three-dimensional area in the display unit 10.

Moreover, for example, when an unaided-eye-type 3D display is used in which the voltage control method is implemented, the deciding unit 22 can decide, in the following manner, on the range of the space within which three-dimensional operation inputs are received. Firstly, from the display control unit 21, the deciding unit 22 receives control information of the voltage to be applied to the light ray control element. Then, based on the control information of the voltage, the deciding unit 22 identifies a display range of stereoscopic images. Subsequently, based on the display range of stereoscopic images that is the deciding unit 22 decides on the range of the space within which three-dimensional operation input are received. In this way, the deciding unit 22 can decide on the range of the space within which three-dimensional operation inputs are received.

Given below is the explanation about the manner in which the range of the space decided by the deciding unit 22 is implemented in a concrete manner in the information processing device 100. For example, in the case when a three-dimensional operation input is detected using a sensor, the detectable range of the sensor can be set to be the range of the space decided by the deciding unit 22. Thus, the range of the space decided by the deciding unit 22 can be set by changing the settings for the detectable range of the sensor hardware. Alternatively, instead of changing the settings for the detectable range of the sensor hardware, if the three-dimensional coordinate information obtained from a particular three-dimensional operation input is not within the range of the space decided by the deciding unit 22, that particular three-dimensional coordinate information can be destroyed. With that, the range of the space within which three-dimensional operation inputs are received is implemented.

When the three-dimensional coordinate information obtained from a three-dimensional operation input is within the range of the space decided by the deciding unit 22, the determining unit 23 determines that the three-dimensional operation input is valid. When the three-dimensional operation input is determined to be valid, the determining unit 23 sends the three-dimensional coordinate information, which is obtained from the three-dimensional operation input, to the input information processing unit 24.

The input information processing unit 24 processes the three-dimensional coordinate information received from the determining unit 23 and processes the two-dimensional coordinate information received from the two-dimensional input unit 40. Such processing includes, for example, converting the three-dimensional coordinate information into a three-dimensional coordinate representing the position in the three-dimensional object; and rotating or moving the three-dimensional object which is being displayed within the display range of stereoscopic images, according to the three-dimensional coordinate information.

Meanwhile, the configuration can be such that the user of the information processing device 100 can change, according to his or her preference, the manner in which the three-dimensional coordinate information of the input information processing unit 24 is processed. For example, if a user wishes to move in a large way within the screen of stereoscopic image displayed in the display unit 10 by performing a small three-dimensional operation input, then the three-dimensional coordinate information that is obtained is converted into a three-dimensional coordinate representing the position in the three-dimensional object so as to enhance the movement scale. On the contrary, if a user wishes to move in a small way within the screen of a stereoscopic image displayed in the display unit 10 by performing a large three-dimensional operation input, then the three-dimensional coordinate information that is obtained is converted into a three-dimensional coordinate representing the position in the three-dimensional object so as to reduce the movement scale.

The scope of processing the three-dimensional coordinate information can be determined, as may be necessary, by the user by operating an input device within a preferred range or by changing the movement scale.

In the case when the processing result of the received information (at least either the two-dimensional coordinate information or the three-dimensional coordinate information) is to be reflected in the display on the display unit 10, the input information processing unit 24 sends to the display control unit 21 the information necessary for reflecting the screen display according to the processing result.

Figure 4:
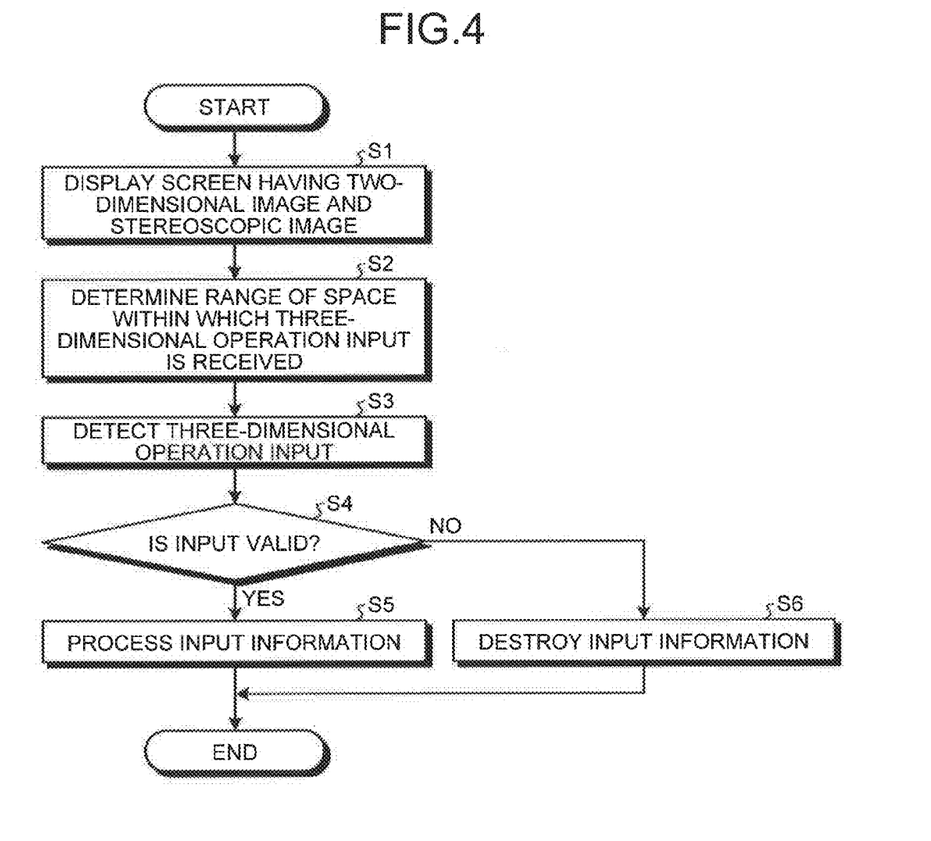
FIG. 4 is a flowchart for explaining an exemplary input controlling method.

Given below is the explanation of an input controlling method according to the embodiment. FIG. 4 is a flowchart for explaining an exemplary input controlling method according to the embodiment. The display control unit 21 displays on the display unit 10 a screen having a two-dimensional image and a stereoscopic image (Step S1).

Figure 5:
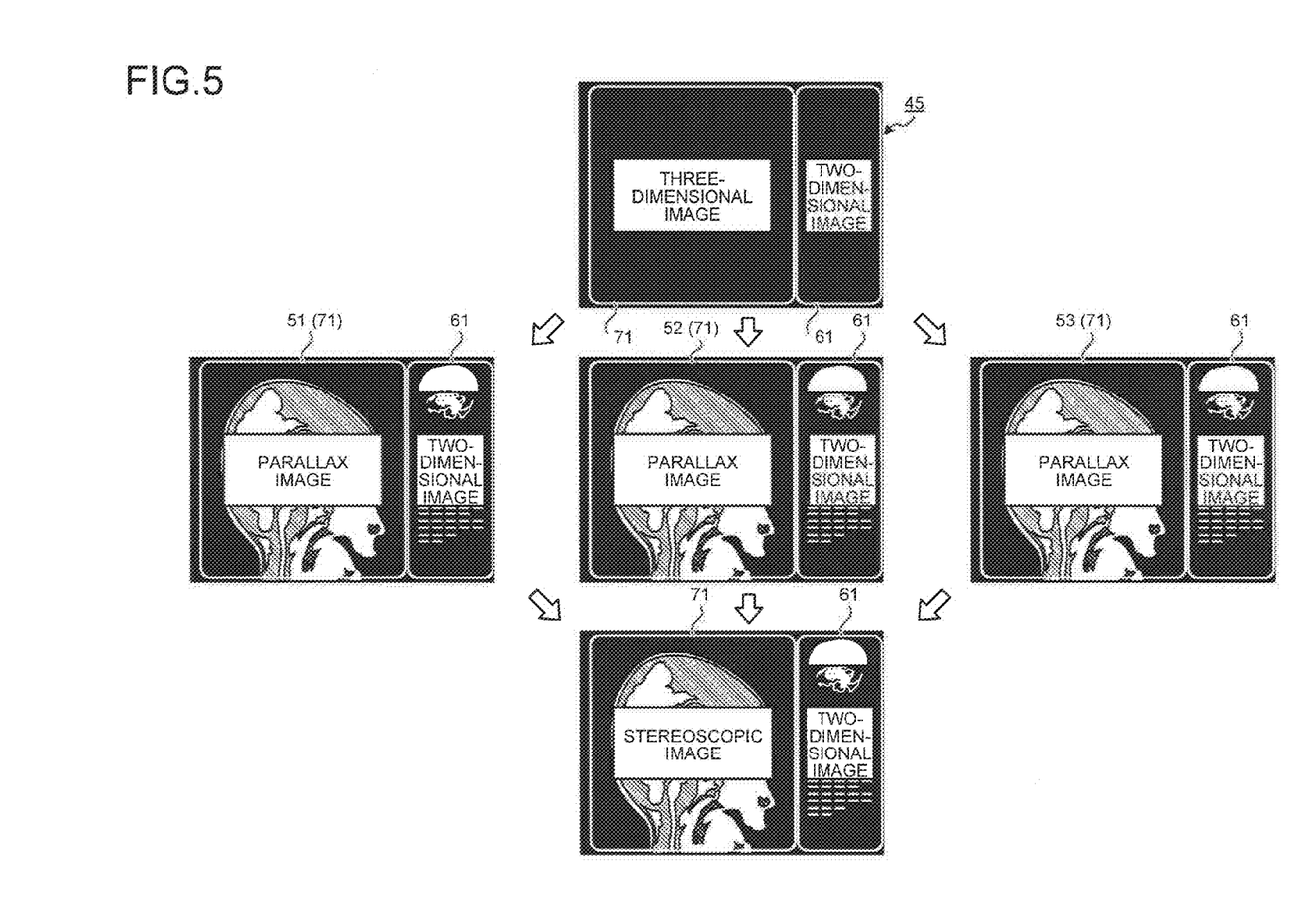
FIG. 5 is a diagram illustrating an example of a screen having a two-dimensional image and a stereoscopic image.

FIG. 5 is a diagram illustrating an example of a screen having a two-dimensional image and a stereoscopic image. The display control unit 21 receives, from an application or the operating system (OS) running in the information processing device 100, display information 45 that contains a screen layout of the display unit 10 and images to be displayed on the screen. In a three-dimensional area 71, the display control unit 21 displays a parallax image 51, a parallax image 52, and a parallax image 53. Herein, the parallax images 51 to 53 are images in which the same object is viewed from three different viewpoints. The number of parallax images is not limited to three, and can be set in an arbitrary manner. Generally, greater the number of parallax images used in displaying a stereoscopic image, greater is the stereoscopic effect that is obtained as a result. However, corresponding to the number of parallax images, the display on which the stereoscopic image is to be displayed needs to have a suitable number of pixels. Meanwhile, unlike the three-dimensional area 71; in a two-dimensional area 61, the display control unit 21 displays a single two-dimensional image. With that, the display control unit 21 can display a stereoscopic image in the three-dimensional area 71 of the display unit 10, and can display a two-dimensional image in the two-dimensional area 61 of the display unit 10.

Returning to the explanation with reference to based on the position of the three-dimensional area, the deciding unit 22 decides on the range of the space within which a three-dimensional operation input is received (Step S2). For example, in the example illustrated in FIG. 5, based on the position of the three-dimensional area 71, the deciding unit 22 decides on the range of the space within which a three-dimensional operation input is received. In this case, for example, as the range of the space within which a three-dimensional operation input is received, the deciding unit 22 can decide on the space of a cuboid that includes the three-dimensional area 71 as one of its faces. Meanwhile, when there is a change in the position of the three-dimensional area; based on the position of the three dimensional area that has been changed, the deciding unit 22 re-decides on the range of the space within which a three-dimensional operation input is received.

Figure 6:
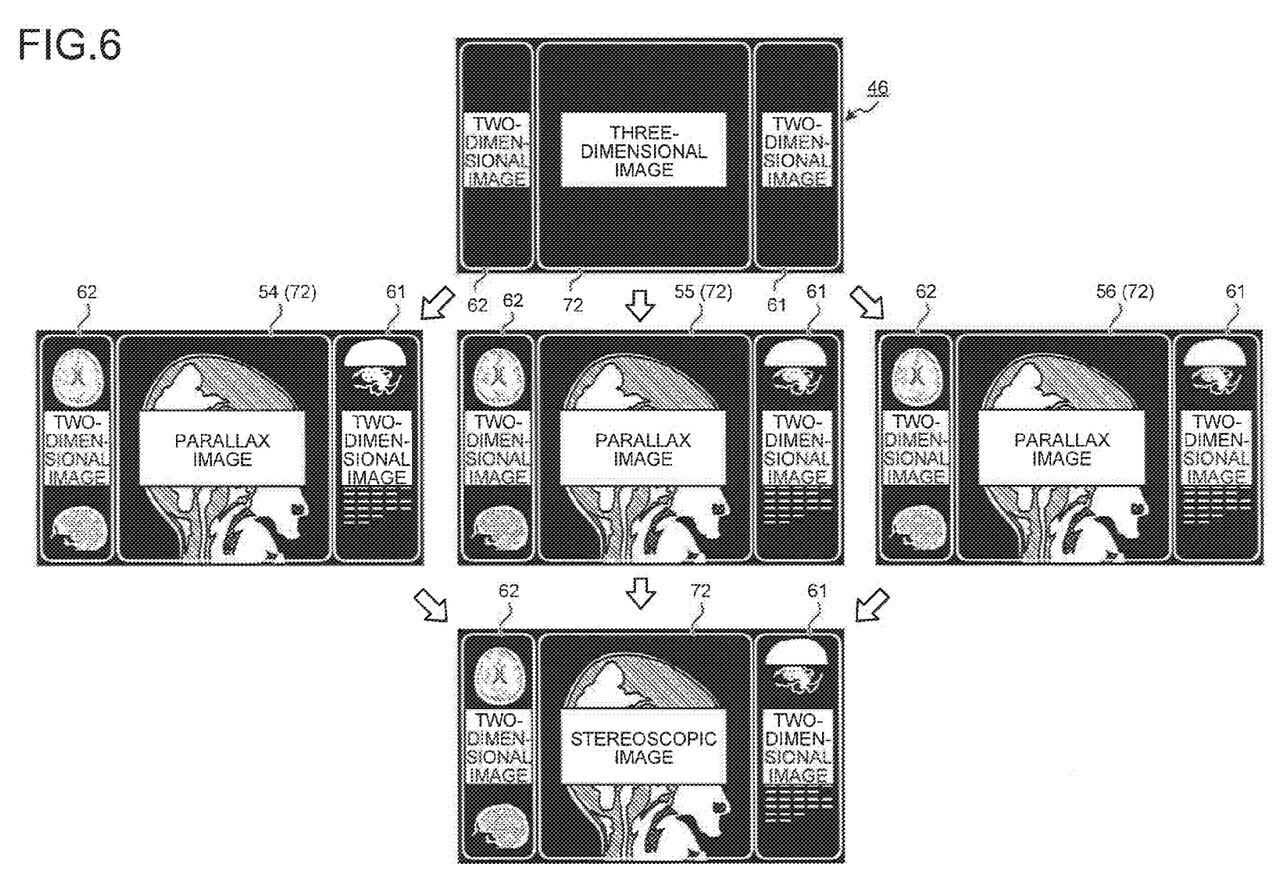
FIG. 6 is a diagram illustrating an example of a screen having a two-dimensional image and a stereoscopic image.

The following explanation is given for a case in which there is a change in the three-dimensional area in the display unit 10. FIG. 6 is a diagram illustrating an example of a screen having a two-dimensional image and a stereoscopic image. For example, the explanation is given for a case in which the display contents in the display unit 10 are changed from the condition illustrated in FIG. 5 to the condition illustrated in FIG. 6. In the example illustrated in FIG. 6, the three-dimensional area 71 illustrated in FIG. 5 is divided into a two-dimensional area 62 and a three-dimensional area 72. However, there is no change in the size of the two-dimensional area 61.

Regarding the explanation with reference to FIG. 6, the display control unit 21 receives, from an application or the operating system (OS) running in the information processing device 100, display information 46 that contains a screen layout of the display unit 10 and images to be displayed on the screen. In the three-dimensional area 72, the display control unit 21 displays a parallax image 54, a parallax image 55, and a parallax image 55. Unlike in the three-dimensional area 72; in each of the two-dimensional areas 61 and 62, the display control unit 21 displays a single two-dimensional image. With that, the display control unit 21 can display a stereoscopic image in the three-dimensional area 72 of the display unit 10, and can display a two-dimensional image in each of the two-dimensional areas 61 and 62 of the display unit 10.

When the screen of the display unit 10 is changed from the condition illustrated in FIG. 5 to the condition illustrated in FIG. 6, the deciding unit 22 refers to the three-dimensional area 72 and accordingly re-decides on the range of the space within which a three-dimensional operation input is received.

Returning to the explanation with reference to FIG. 4, the three-dimensional input unit 30 obtains three-dimensional coordinate information corresponding to the three-dimensional operation input (Step S3). Then, the determining unit 23 determines whether or not the three-dimensional coordinate information is within the range of the space decided by the deciding unit 22, and thus determines whether or not the input (the three-dimensional coordinate information) is valid (Step S4). Herein, the three-dimensional coordinate information being "valid" points to the case in which the three-dimensional coordinate information is within the range of the space decided by the deciding unit 22. When the three-dimensional coordinate information is valid (Yes at Step S4), it is sent to the input information processing unit 24. Then, the input information processing unit 24 performs operations such as converting the three-dimensional coordinate information into a three-dimensional coordinate that represents the position in the three-dimensional object (Step S5). On the other hand, if the three-dimensional coordinate information is not valid (No at Step S4), it is destroyed (Step S6).

Figure 7:
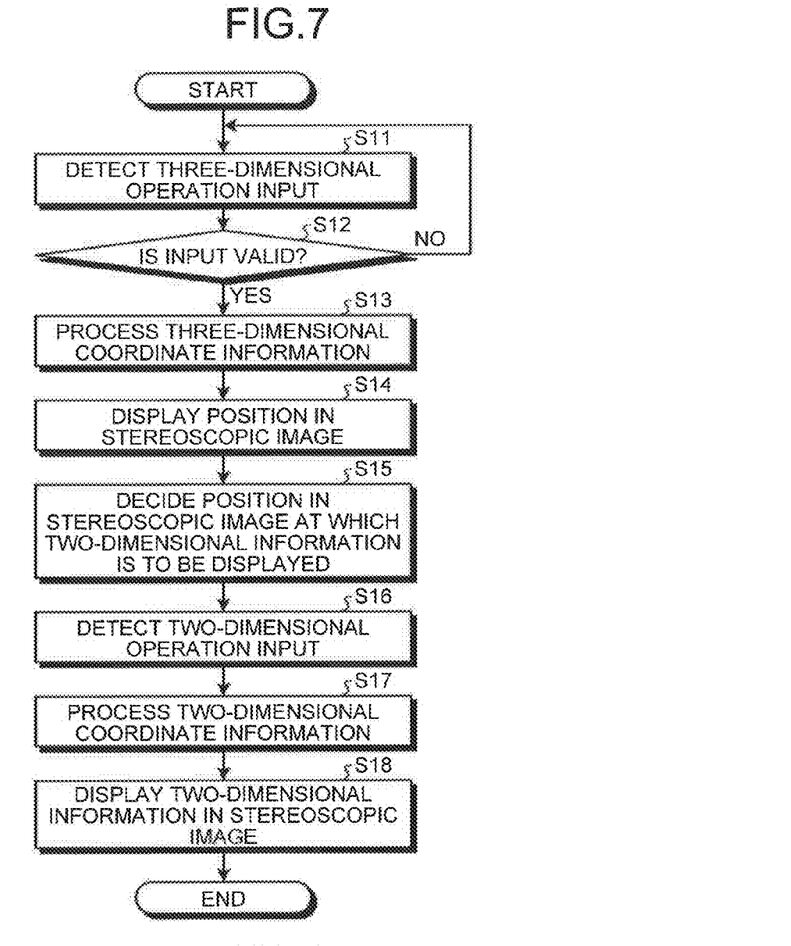
FIG. 7 is a diagram illustrating an exemplary case in which two-dimensional information is input in a stereoscopic image.

Given below is the explanation of the input controlling method in the case when a two-dimensional operation input and a three-dimensional operation input are combined together. FIG. 7 is a diagram illustrating an exemplary case in which two-dimensional information is input in a stereoscopic image that is being displayed in the display unit 10 of the information processing device 100 according to the embodiment. The following explanation is given for a case in which a two-dimensional operation input and a three-dimensional operation input are combined together and two-dimensional information such as characters or symbols are displayed in a stereoscopic image.

The three-dimensional input unit 30 obtains three-dimensional coordinate information corresponding to the three-dimensional operation snout (Step S11). Then, the determining unit 23 determines whether or not that three-dimensional coordinate information is within the range of the space decided by the deciding unit 22 and thus determines whether or not the input (the three-dimensional coordinate information) is valid (Step S12).

If the three-dimensional coordinate information not valid (No at Step S12), then the system control returns to Step S11 and detection of a three-dimensional operation input is awaited. For example, in the information processing device 100, an error notifying that the three-dimensional operation input is not performed in a valid search range is displayed in the display unit 10 so as to prompt the user of the information processing device 100 to again perform a three-dimensional operation input.

When the three-dimensional coordinate information is valid (Yes at Step S12), it is sent to the input information processing unit 24. Then, the input information processing unit 24 processes the three-dimensional coordinate information (Step S13). Such processing includes, for example, deciding on the three-dimensional coordinate, which represents the position in the three-dimensional object corresponding to the three-dimensional coordinate information, from the three-dimensional coordinate information. Then, the input information processing unit 24 sends to the display control unit 21 the information necessary for reflecting the screen display according to the processing result of the three-dimensional coordinate information. Subsequently, the display control unit 21 displays, with a cursor or the like, the position in the three dimensional object corresponding to the three-dimensional operation input obtained at Step S11 (Step S14). Then, the display control unit 21 determines the position in the stereoscopic image at which the dimensional information is to be displayed (Step S15). Subsequently, the two-dimensional input unit 40 obtains two-dimensional coordinate information corresponding to the two-dimensional operation input (step S15). The input information processing unit 24 processes the two-dimensional coordinate information (Step S17). Such processing includes, for example, determining the characters or the symbols to be displayed on the screen of the display unit 10. That is, such processing includes generating a character image to be displayed in the display unit 10 by referring to handwritten character information received by the two-dimensional input unit 40. Then, the input information processing unit 24 sends to the display control unit 21 the information necessary for reflecting the screen display according to the processing result of the two-dimensional coordinate information. Subsequently, at the position in the three-dimensional object as determined at Step S15, the display control unit 21 displays the two-dimensional coordinate information, such as characters and symbols, corresponding to the two-dimensional operation input (Step S18).

Meanwhile, the method of displaying the two-dimensional information such as characters and symbols in a stereoscopic image is not limited to the explanation given above. Alternatively, it is also possible to firstly process the two-dimensional information and then process the three-dimensional information.

As described above, in the information processing device 100 according to the embodiment, based on the position at the three-dimensional area in the display unit 10, the deciding unit 22 decides on the range of the space within which it is possible to receive operations performed by an input device for the purpose of operating a stereoscopic image. When three-dimensional coordinate information is within the range decided by the deciding unit 22, the display control unit 21 operates the stereoscopic image. As a result, the user of the information processing device 100 can constantly perform a three-dimensional operation input at the position (space) that is based on the display range. That is, the user of the information processing device 100 can constantly perform a three-dimensional operation input on the front side of the area in which the stereoscopic image of the target for operations is being displayed. For that reason, the user of the information processing device 100 becomes able to perform intuitive operations with respect to the stereoscopic image being displayed in the display unit 10.

Moreover, since the user of the information processing device 100 uses the two-dimensional input unit 40 and the three-dimensional input unit 30 in a combined manner, he or she becomes able to perform intuitive operations with respect to the screen in the case when the screen has a display area for two-dimensional images as well as a display area for stereoscopic images.

In the information processing device 100 according to the embodiment, when the screen has a display area for two dimensional images as well as a display area for stereoscopic images, it becomes possible to perform more intuitive operations with respect to the stereoscopic image being displayed on the screen.

Figure 8:
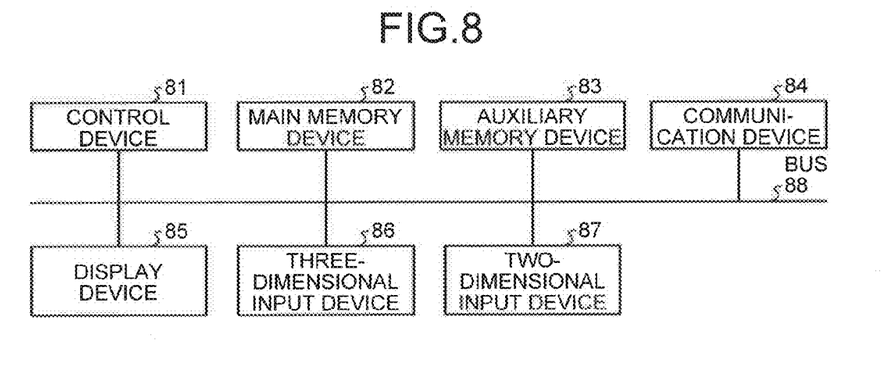
FIG. 8 is a diagram illustrating an exemplary hardware configuration of the main constituent elements of the information processing device.

Lastly, the explanation is given about a hardware configuration of the main constituent elements of the information processing device 100 according to the embodiment. FIG. 8 is a diagram illustrating an exemplary hardware configuration of the main constituent elements of the information processing device 100 according to the embodiment. The information processing device 100 according to the embodiment includes a control device 81, a main memory device 82, an auxiliary memory device 83, a communication device 84, a display device 85, a three-dimensional input device 86, and a two-dimensional input device 87. Herein, the control device 81, the main memory device 82, the auxiliary memory device 83, the communication device 84, the display device 85, the three-dimensional input device 86, and the two-dimensional input device 87 are connected to each other via a bus 88. The display device 85 corresponds to the display unit 10 illustrated in FIG. 1. The control device 81, the main memory device 82, the auxiliary memory device 83, the communication device 84, the three-dimensional input device 86, and the two-dimensional input device 87 correspond to the image processing device 90 illustrated in FIG. 1.

The control device 81 executes computer programs that are loaded from the auxiliary memory device 83 in the main memory device 82. Herein, the main memory device 82 points to a read only memory (ROM) or a random access memory (RAM). The auxiliary memory device 83 points to, for example, a hard disk. The display device 85 points to a screen used to display the condition of the information processing device 100. The three-dimensional input device 86 points to an interface used to perform three-dimensional inputs to the information processing device 100. The two-dimensional input device 87 points to an interface used to perform two-dimensional inputs to the information processing device 100. The communication device 84 points to an interface for establishing a connection with a network.

Meanwhile, the computer programs executed in the information processing device 100 according to the embodiment can be recorded in the form of installable or executable files in a computer-readable recording medium such as a compact disk read only memory (CD-ROM), a memory card, a compact disk readable (CD-R), or a digital versatile disk (DVD); and can be provided as a computer program product. Alternatively, the computer programs executed in the information processing device 100 according to the embodiment can be saved as downloadable files on a computer connected to the Internet or can be made available for distribution through a network such as the Internet. Still alternatively, the computer programs executed in the information processing device 100 according to the embodiment can be stored in advance in a ROM.

Moreover, the computer programs executed in the information processing device 100 according to the embodiment contain a module for such functional blocks from among the functional blocks of the information processing device 100 which are implementable as computer programs (such as the display control unit 21, the deciding unit 22, the determining unit 23, and the input information processing unit 24).

As the actual hardware, for example, the control device 81 reads the computer programs from a memory medium and runs them such that the computer programs are loaded in the main memory device 82. As a result, the module for each of the abovementioned constituent elements is implemented in the main memory device 82. Meanwhile, alternatively, some or all of the functional blacks of the information processing device 100 can be implemented using hardware such as an integrated circuit (IC).

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A display device comprising:
    a display configured to display partially a two-dimensional image in a two-dimensional area and a stereoscopic image in a three-dimensional area;
    a deciding unit configured to, based on a position of the three-dimensional area in the display, decide on a range of a space in front of the display, within which operation of the stereoscopic image with an input device is allowed;
    a three-dimensional input unit configured to obtain three-dimensional coordinate information inputted by the input device with respect to the display; and
    a controller configured to when the three-dimensional coordinate information is within the range, operate the stereoscopic image in accordance with the three-dimensional coordinate information.

2. The device according to claim 1, wherein
    the controller sends coordinate information, which represents the position of the three-dimensional area in the display, to the deciding unit, and
    based on the position of the three-dimensional area in the display as identified by the coordinate information, the deciding unit decides on the range.

3. The device according to claim 1, wherein
    the display includes a display panel and includes a light ray control element configured to control light ray emitted from pixels of the display panel,
    the controller controls a voltage applied to the light ray control element to control the two-dimensional area and the three-dimensional area, and
    the deciding unit identifies the position of the three-dimensional area in the display based on control information of the voltage and decides on the range based on the identified position.

4. The device according to claim 1, further comprising a two-dimensional input unit configured to obtain two-dimensional coordinate information indicated by the input device, wherein
    the display device displays two-dimensional information, which is based on the two-dimensional coordinate information, at the position of the three-dimensional area in the display as specified by the three-dimensional input unit.

5. The device according to claim 1, wherein
    the range of the space is determined in accordance with parameters controlling display properties of the three-dimensional area.

6. The device according to claim 4, wherein
    the two-dimensional input unit obtains the two-dimensional coordinate information indicated by the input device, when the input device is not present in the range of the space.

7. The device according to claim 4, wherein
    the two-dimensional input unit has a plane that is different from the display, and
    the two-dimensional input unit obtains the two-dimensional coordinate information indicated by the input device, when a distance from the plane is less than a predetermined value.

8. The device according to claim 1, wherein
    the range of the space in front of the display is set in advance the input device as a predetermined three-dimensional space.

9. A control device connected to the display device to display partially a two-dimensional image in a two-dimensional area and a stereoscopic image in a three-dimensional area, the control device comprising:

a deciding unit configured to, based on a position of the three-dimensional area in the display, decide on a range of a space in front of the display, within which operation of the stereoscopic image with an input device is allowed;

a three-dimensional input unit configured to obtain three-dimensional coordinate information inputted by the input device with respect to the display; and a controller configured to, when the three-dimensional coordinate information is within the range, operate the stereoscopic image in accordance with the three-dimensional coordinate information.

10. The device according to claim 9, wherein the controller sends coordinate information, which represents the position of the three-dimensional area in the display, to the deciding unit, and based on the position of the three-dimensional area in the display as identified by the coordinate information, the deciding unit decides on the range.

11. The device according to claim 9, wherein the display includes a display panel and includes a light ray control element configured to control light ray emitted from pixels of the display panel, the controller controls a voltage applied to the light ray control element to control the two-dimensional area and the three-dimensional area, and the deciding unit identifies the position of the three-dimensional area in the display based on control information of the voltage and decides on the range based on the identified position.

12. The device according to claim 9, further comprising a two-dimensional input unit configured to obtain two-dimensional coordinate information indicated by the input device, wherein the display device displays two-dimensional information, which is based on the two-dimensional coordinate information, at the position of the three-dimensional area in the display as specified by the three-dimensional input unit.

13. The device according to claim 9, wherein the range of the space is determined in accordance with parameters controlling display properties of the three-dimensional area.

14. The device according to claim 12, wherein the two-dimensional input unit obtains the two dimensional coordinate information indicated by the input device, when the input device is not present in the range of the space.

15. An image processing method comprising:

displaying partially a two-dimensional image in a two-dimensional area and a stereoscopic image in a three-dimensional area;

deciding, based on a position of the three-dimensional area in a display, on a range of a space in front of the display, within which operation of the stereoscopic image with an input device is allowed;

obtaining three-dimensional coordinate information inputted by the input device with respect to the display; and operating the stereoscopic image when the three-dimensional coordinate information is within the range in accordance with the three-dimensional coordinate information.

16. The image processing method according to claim 15, wherein the deciding includes deciding the range based on the position of the three-dimensional area in the display as identified by coordinate information, which represents the position of the three-dimensional area in the display.

17. The image processing method according to claim 15, wherein the display includes a display panel and includes a light ray control element configured to control light ray emitted from pixels of the display panel, the method further comprising controlling a voltage applied to the light ray control element to control the two-dimensional area and the three-dimensional area, wherein the deciding includes identifying the position of the three-dimensional area in the display based on control information of the voltage and deciding on the range based on the identified position.

18. The image processing method according to claim 15, further comprising obtaining two-dimensional coordinate information indicated by the input, device; and displaying, in the display, two-dimensional information, which is based on the two-dimensional coordinate information, at the position of the three-dimensional area, which is based on the three-dimensional coordinate information.

19. The image processing method according to claim 15, further comprising determining the range of the space in accordance with parameters controlling display properties of the three-dimensional area.

20. The image processing method according to claim 10, wherein the obtaining the two-dimensional coordinate information includes obtaining the two-dimensional coordinate information indicated by the input device, when the input device is not present in the range of the space.

* * * * *